United States Patent
Vigneras

(10) Patent No.: US 9,490,078 B2
(45) Date of Patent: Nov. 8, 2016

(54) COVER FOR AN ENERGY STORAGE UNIT, ENERGY STORAGE UNIT COMPRISING SAID COVER, AND METHOD FOR MANUFACTURING SUCH AN ENERGY STORAGE UNIT

(71) Applicant: BLUE SOLUTIONS, Ergue Gaberic (FR)

(72) Inventor: Erwan Vigneras, Quimper (FR)

(73) Assignee: BLUE SOLUTIONS, Ergue Gaberic (FR)

( * ) Notice: Subject to any disclaimer, the term of this patent is extended or adjusted under 35 U.S.C. 154(b) by 147 days.

(21) Appl. No.: 14/377,169

(22) PCT Filed: Feb. 7, 2013

(86) PCT No.: PCT/EP2013/052448
§ 371 (c)(1),
(2) Date: Aug. 6, 2014

(87) PCT Pub. No.: WO2013/117654
PCT Pub. Date: Aug. 15, 2013

(65) Prior Publication Data
US 2014/0376159 A1    Dec. 25, 2014

(30) Foreign Application Priority Data
Feb. 7, 2012 (FR) ..................................... 12 51138

(51) Int. Cl.
*H01G 9/10* (2006.01)
*H01G 9/00* (2006.01)
(Continued)

(52) U.S. Cl.
CPC .................. *H01G 9/10* (2013.01); *H01G 2/10* (2013.01); *H01G 2/103* (2013.01); *H01G 2/106* (2013.01);
(Continued)

(58) Field of Classification Search
CPC ........ H01G 2/10; H01G 2/103; H01G 2/106; H01G 4/32; H01G 9/08; H01G 9/10; H01G 11/78; H01G 11/80
See application file for complete search history.

(56) References Cited

U.S. PATENT DOCUMENTS

| 4,494,174 A | 1/1985 | Schroeder |
| 5,348,815 A | 9/1994 | Barker |

(Continued)

FOREIGN PATENT DOCUMENTS

| CN | 101436668 A | 5/2009 |
| EP | 0 836 237 A1 | 4/1998 |

(Continued)

OTHER PUBLICATIONS

Non-Final Office Action in U.S. Appl. No. 14/377,166, mailed May 5, 2016. 7 Pages.

*Primary Examiner* — Dion R Ferguson
(74) *Attorney, Agent, or Firm* — Blakely Sokoloff Taylor & Zafman LLP

(57) ABSTRACT

The invention relates to a cover (40) for an energy storage unit, which is to be inserted at an end of a casing (20) in which a capacitive element (30) of the unit is arranged, the cover comprising at least one sidewall (43) which to be arranged opposite at least one sidewall of the casing and two end walls (41, 42), characterized in that a plurality of cavities (46, 48) are provided in the cover, at least one first cavity (46) opening onto the sidewall(s) (43) and onto an end wall (41), and at least one second cavity (48) opening onto the sidewall(s) (43) and onto the other end wall (42), the first cavity or cavities opening onto the sidewall(s) (43) in one or more first portions extending over a portion of the periphery of the sidewall(s), while the second cavity or cavities (48) open onto the sidewall(s) (43) in one or more second portions extending over a portion of the periphery of the sidewall(s).

11 Claims, 2 Drawing Sheets

(51) Int. Cl.
  *H01G 9/08* (2006.01)
  *H01G 11/78* (2013.01)
  *H01G 11/80* (2013.01)
  *H01G 11/84* (2013.01)
  *H01G 2/10* (2006.01)
  *H01M 2/04* (2006.01)
  *H01G 9/145* (2006.01)
  *H01G 13/00* (2013.01)

(52) U.S. Cl.
  CPC .............. *H01G 9/0029* (2013.01); *H01G 9/08* (2013.01); *H01G 9/145* (2013.01); *H01G 11/78* (2013.01); *H01G 11/80* (2013.01); *H01G 11/84* (2013.01); *H01G 13/003* (2013.01); *H01M 2/04* (2013.01); *H01M 2/0434* (2013.01); *Y02E 60/13* (2013.01); *Y10T 29/417* (2015.01)

(56) References Cited

U.S. PATENT DOCUMENTS 5,798,906 A  8/1998  Ando et al.
7,817,404 B2 * 10/2010  Miura ..................... H01G 9/10
                                                              29/25.03
2013/0027846 A1  1/2013  Ashino et al.

FOREIGN PATENT DOCUMENTS

EP  1 737 005 A2  12/2006
EP  2 104 122 A1  9/2009
EP  2 385 566 A1  11/2011
JP  59175553 A  10/1984
WO  WO 2007/132462 A1  11/2007

* cited by examiner

COVER FOR AN ENERGY STORAGE UNIT, ENERGY STORAGE UNIT COMPRISING SAID COVER, AND METHOD FOR MANUFACTURING SUCH AN ENERGY STORAGE UNIT

TECHNICAL FIELD

The present invention relates to the technical field of electrical energy-storage units.

More particularly, the present invention relates to a cover of an energy-storage unit, an energy-storage unit and a manufacturing method for such an energy-storage unit.

Within the scope of the present invention, << electrical energy-storage unit >> means a capacitor (i.e. a passive system comprising two electrodes and an insulator), or a ultra-capacitor (i.e. a passive system comprising at least two electrodes, an electrolyte and at least one separator), or a battery (i.e. a system comprising an anode, a cathode and an electrolyte solution between the anode and the cathode), for example of lithium battery type.

STATE OF THE ART

The state of the art discloses, especially from documents, an energy-storage unit comprising a cover placed inside an envelope of the energy-storage unit, at an open end of such an envelope, the cover comprising a lateral wall intended to be located inside a lateral wall of the envelope, opposite the latter. A groove is made in the lateral wall of the cover and the lateral wall of the envelope is stamped to be fitted in the groove and folded back at the end of the cover, keeping the envelope of the energy-storage unit closed.

Document EP 2 104 122 describes for example a step of mechanical crimping or heading consisting of deforming the tubular envelope to fold it against the cover. A sealing piece of elastomer type—such as a joint—is then compressed between the cover and the envelope to ensure sealing against liquid and gas.

Such an energy-storage unit is closed satisfactorily. However, to be able to increase the volumic capacity of a energy-storage module generally comprising a plurality of energy-storage units, the aim is to decrease the bulk of the envelope of each energy-storage unit.

One of the aims of the invention is therefore to provide a cover ensuring satisfactory closing of the storage unit tout by decreasing the bulk of the envelope and accordingly increasing the volumic capacity of the unit.

SUMMARY OF THE INVENTION

For this purpose a cover for an energy-storage unit is proposed, intended to be inserted at one end of an envelope wherein a capacitive element of the unit is placed, the cover comprising at least one lateral wall intended to be placed opposite at least one lateral wall of the envelope and two end walls, a plurality of cavities being arranged in the cover, at least one first cavity opening on the lateral wall and an end wall and at least one second cavity opening on the lateral wall and the end wall, the first cavity or the first cavities opening on the lateral wall in a first portion or first portions extending over part of the circumference of the lateral wall or lateral walls, while the second cavity or the second cavities opens in a second portion or second portions extending over part of the circumference of the lateral wall or lateral walls.

To secure a cover according to the invention and the envelope, the lateral wall of the envelope is folded back at its end in the portions located opposite the cavities located at the end of the cover (opening on the external end wall of the cover) and the envelope is crimped in the parts located in faces of the other cavities (opening on the end inner wall of the cover).

Arranging the cover in this way decreases its thickness since the sum of the thicknesses of the two cavities can be less than the thickness of a groove made entirely in the lateral part. Such a groove actually needs a certain minimal thickness so that the lateral wall folded back from the lateral wall of the envelope can be lodged in the groove, this restriction disappearing with the architecture of the cover according to the invention.

In addition, the architecture of the cover according to the invention prevents undulations of the end of the lateral wall of the folded back envelope which could occur if the cavities of the cover extended over the entire circumference of the cover. In fact, in this case when the lateral wall of the envelope is folded back at the end of the cover, the diameter of the envelope is decreased at its end, causing the appearance of undulations in the normal direction to the end wall of the cover when the envelope is folded back over its entire circumference. Since the cavities extend over part of the circumference of the cover only, the decrease in the diameter of the cover at its end is less and this phenomenon of undulations is attenuate or even eliminated.

Also, since the cavities for holding the cover according to one direction and those holding it according to the opposite direction are decorrelated, it can be designed independently, such that they adapt better to the relative needs for operation of the unit. In fact, the size and the number of the cavities opening on the different end walls can be made asymmetrical as a function of the forces likely to be exerted on the unit. In this way, the external end face of more cavities or cavities having a greater total angular portion than the internal end face can be provided, since the forces due to overpressure of the unit during its service life are potentially highly substantial.

It is also evident that such a cover according to the invention is simpler and easier to manufacture since it can be moulded easily, as opposed to a cover comprising a groove, which raises demoulding problems.

It is also evident that a cover according to this embodiment does not make assembly of the cover and of the capacitive element, generally done by LASER welding, more complex than in the state of the art, since some portions of the end face, devoid of cavity, have the same configuration as according to the state of the art and extend as far as the end of the coiled element, ensuring good electrical conduction between the coiled element and the cover.

The cover according to the invention can comprise the one or more of the following characteristics:

the first and second portions of the lateral wall (wherein the first and second cavities are respectively arranged) are separate, particularly to avoid embrittling a zone of the cover. In other words, the cavities are offset angularly in a plane corresponding to the end plane. They are therefore not fully superposed according to the normal direction to the end walls but can overlap. This means that a straight line extending over the lateral wall according to the normal direction to the end wall to intersect a first cavity, respectively second cavity, can also intersect a second, respectively first, cavity. If two cavities are superposed, any straight line intersecting a (first, respectively second) cavity will intersect another (second, respectively first) cavity. If two cavities overlap, some of the straight lines will intersect another cavity, though others will not intersect another cavity.

preferably, the cavities are arranged so as to be staggered. They are not at all superposed according to a normal direction to the end walls and present no portion angular in common. In this way, any straight line extending over the lateral wall according to the normal direction to the end wall intersecting a given cavity intersects no other cavity, the sum of the thicknesses of at least one (or one of the) first cavity or cavities and of at least one (or one of the) second cavity or cavities (according to the normal direction to the end wall) can be greater than the thickness of the cover (in this direction), allowing extra freedom of design to further decrease the thickness of the cover. The cavities can especially constitute each over half of the height of the cover, as a variant, the lateral wall or the lateral walls of the cover can comprise a central part extending over the entire circumference of the lateral wall or lateral walls of the cover and devoid of cavity, to better ensure sealing of the cover, at least one of the cavities can be of constant thickness (according to the normal direction to the end walls). As a variant, at least one of the cavities can be of variable thickness. It can for example have a profile in an arc of a circle or in waves in the plane of the lateral wall or lateral walls, the dimension of the cavity according to the normal direction to the lateral wall can be constant or variable, the cover can be for example of general cylindrical form, the end walls forming the bases of the cylinder. It can also be of parallelepipedic form, the cover is made at least partially of electrically conductive material, especially metallic material. The cover could also be made partially or fully from plastic material, for example.

The invention also concerns an energy-storage unit comprising a capacitive element housed in an external envelope comprising at least one lateral wall enclosing the capacitive element and open at at least one of its ends, and at least one cover, each cover being inserted in the envelope at its open end or its open ends, at least one cover being according to the invention and the contour of the lateral wall or lateral walls of the envelope following the contour of the lateral wall or lateral walls of the cover.

The envelope can be closed at one of its ends or be attached to a cover at each of its ends, one of the covers or the two covers being according to the invention.

The storage unit can comprise a sealing joint interposed between the lateral wall of the cover and that of the envelope.

The envelope is preferably made of conductive material, especially metallic. It can be also be made of insulating material comprising a conductive coating.

The invention also concerns a manufacturing method for a storage unit comprising:

an external envelope comprising a coupling zone, the external envelope being open at at least one of its ends, at least one cover according to the invention intended to be inserted in the open end of the external envelope, the cover comprising a coupling zone comprising at least one wall of a cavity of the cover, the cover being positioned such that the coupling zones are opposite each other, the method comprising a closing step consisting of applying a compression force to the external envelope of the storage unit such that it comes into contact with the cover at the level of the coupling zones to close the open end of the external envelope with the cover by cooperation of form.

The cover and the envelope can be assembled by crimping and/or mechanical stamping, optionally also with interposition of adhesive.

In a preferred embodiment, the closing step consists of applying a contactless magneto-mechanical force to the external envelope.

As a function of the parameters used during manufacture, this process:

crimps the cover and the external envelope, or welds the external envelope and the cover, wherein case there is continuity of materials of the two pieces and diffusion of atoms from one piece to the other.

Therefore, the method especially enables assembly of pieces made from electrically conductive materials having different melting points, not possible with traditional welding devices.

The advantages of the method according to the invention are the following:

the duration of the closing step is very short, typically less than one second, allowing the method to be adapted to high-volume production;

the temperature rise of the pieces constituting the storage unit is very low, allowing on the one hand no damage to happen to the coiled element or the coiled elements located inside the external envelope and on the other hand allows the possibility of taking some steps such as impregnation prior to the closing step, preventing additional steps for closing the unit.

during execution of the closing step, the relaxation occurring at the interface between the cover and the external envelope is such that it causes a gas jet—comparable to plasma—which sands off the surfaces to be assembled: it is therefore not necessary to prepare the surfaces of the external envelope and of the cover prior to the closing step;

the costs associated with executing the method remain low, since on the one hand the tool for performing the closing step can be used with external envelopes and covers of different diameters, and on the other hand maintenance operations with this tool are limited, since the tool has no moving part, limiting its wear.

In a preferred embodiment, the magneto-mechanical force is applied by means of a device for generation of a magnetic pulse, the method comprising a step for positioning the envelope and the cover so that they are enclosed at least partially by the generation device, especially an inductor of the device. This limits the risk of degradation of a coiled element contained in the envelope by compression of the walls of the envelope on the latter. The inductor comprises especially a coil arranged so as to partially enclose the storage unit at the level of the coupling zones of the cover and of the envelope.

The pulse is preferably generated at an energy of between 5 and 20 kJ. The inductor especially is fed with electrical voltage of between 5 and 6 kV and an electrical current of:

between 150 A and 250 A to perform crimping, between 450 A and 600 A to perform welding.

The cover and the envelope are preferably positioned in the device such that the contactless compression force applies only to the cover and the envelope at the level of the coupling zones.

The method can also comprise, prior to the closing step, a step consisting of positioning a joint—made for example of plastic material (for example polymer or elastomer or a mixture of polymer and elastomer) or ceramic—between the coupling zones of the cover and of the external envelope: this joint ensures at least one of the two following functions:

- sealing at the interface between the cover and the external envelope,
- electrical insulation of the cover and of the external envelope, especially when the external envelope and the cover both comprise an electrically conductive material.

The presence of the joint is more particularly necessary when the cover and the external envelope are electrically conductive.

The method can also comprise, prior to the closing step, a step consisting of depositing a layer of electrically conductive material on the external peripheral face of the external envelope, at least on one coupling zone of the envelope. The envelope electrically insulates the two terminals of the unit without the aid of a joint. Alternatively, such a step can be omitted by avoiding the presence of a joint by using a multilayer material comprising at least one layer electrically insulating internal and another electrically conductive layer.

The method comprises also, prior to the closing step, an impregnation step of a capacitive element intended to be housed in the external envelope.

BRIEF DESCRIPTION OF THE FIGURES

Other characteristics, aims and advantages of the present invention will emerge from the following description, which is purely illustrative and non-limiting and must be considered with respect to the attached drawings, wherein.

DETAILED DESCRIPTION OF THE INVENTION

The different aims according to the invention will now be described in more detail in reference to the figures. In these different figures, the same elements of the method and device bear the same numerical references.

Figure 1:
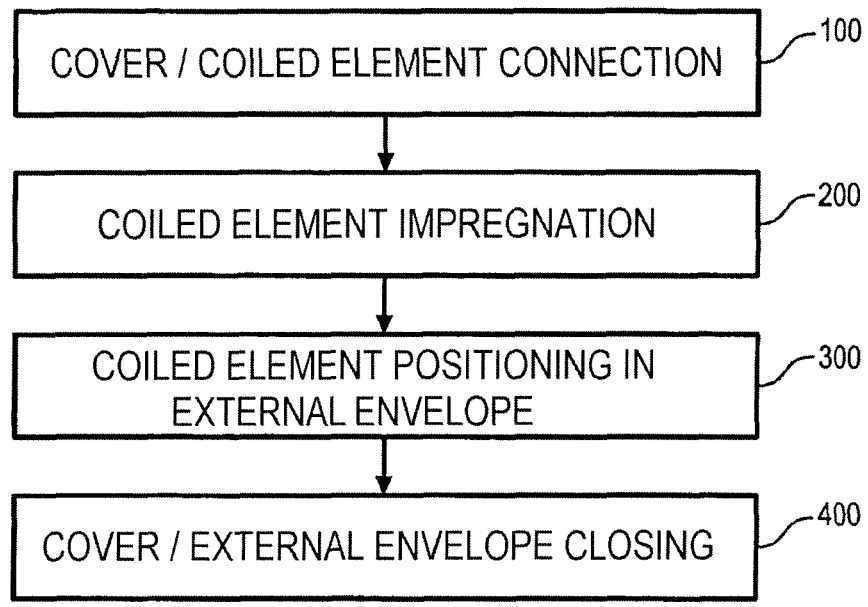
FIG. 1 schematically illustrates steps of the method according to the invention.

In reference to FIG. 1, this illustrates an embodiment of the method according to the invention. This method makes an electrical energy-storage unit comprising a coiled element 30, an external envelope 20 open at one of its ends and a cover 40.

The first step (referenced 100) consists of connecting the cover 40 and the coiled element 30. The cover 40 is arranged on the coiled element 30 and welding—such as Laser welding by transparency—is carried out at the interface between the cover 40 and the coiled element 30.

The second step (referenced 200) consists of impregnating the coiled element connected to the cover in an electrolyte.

The third step (referenced 300) consists of placing the coiled element connected to the cover in the external envelope.

The fourth step (referenced 400) consists of closing the open end of the external envelope with the cover. The method can comprise different variants of the closing step, for example as a function of the materials constituting the cover and the external envelope.

These different variants will be described hereinbelow and comprise in all cases application of a compression force to the envelope such that it fits mechanically in the cover. The application of a compression force can for example be achieved by generating a magnetic pulse.

Those skilled in the art will appreciate that the impregnation step can be performed prior to the closing step. In fact, the closing step is performed (almost) cold, such that the risks of enflaming the electrolyte are limited. It could however also be performed after the closing step.

Figure 3:
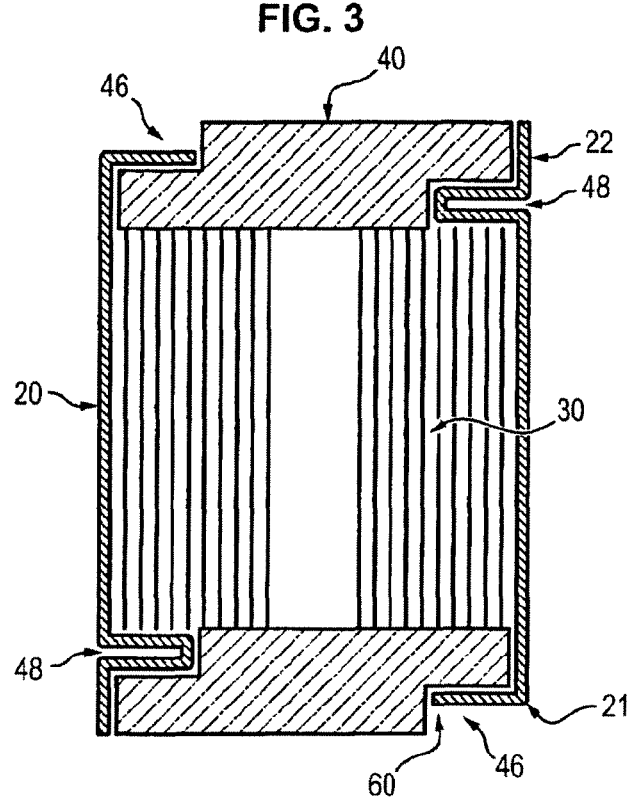
FIG. 3 is a representation in section of part of a unit assembled with a method according to the invention from the cover of FIG. 2.

In reference to FIG. 3, this illustrates an energy-storage unit made by executing an embodiment of the method according to the invention.

The storage unit comprises an external envelope 20, a coiled element 30 and two covers 40.

The external envelope 20 is a tube open at both ends.

Figure 2:
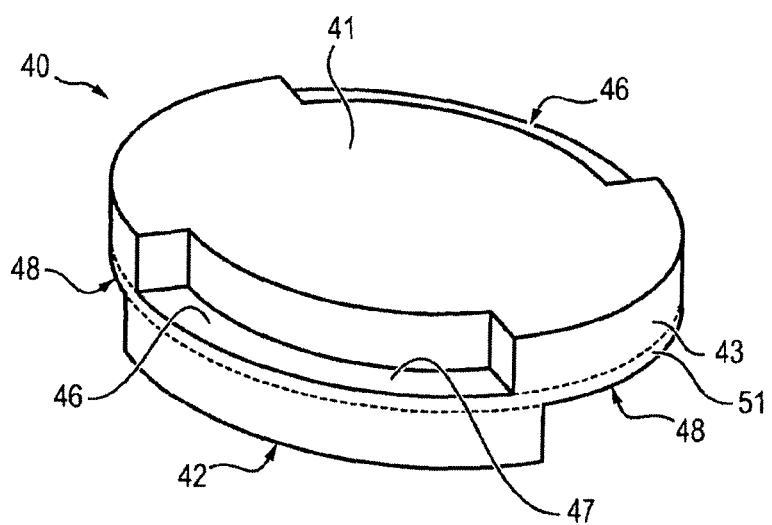
FIG. 2 is a representation in perspective of a cover of a unit according to an embodiment of the invention.

Each cover 40 shown in more detail in FIG. 2 has the following characteristics.

Figure 4:
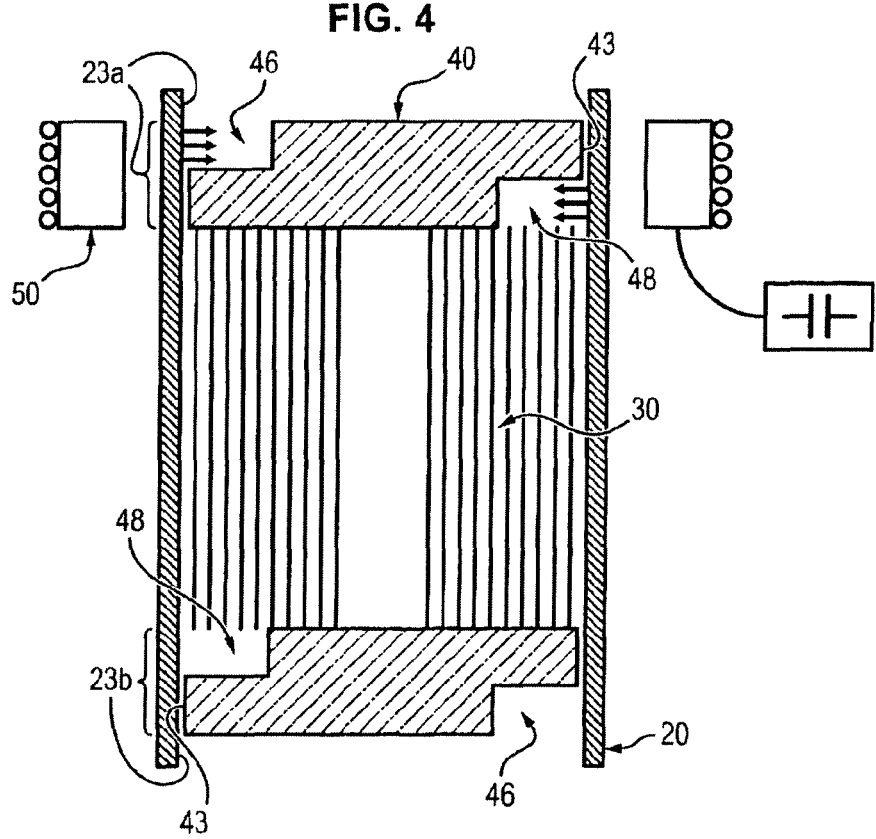
FIG. 4 schematically illustrates an example of a manufacturing device for executing the method according to the invention.

It has a general cylindrical form with two end walls 41 (external) and 42 (internal), forming especially the bases of the cylinder, and a lateral wall 43. This cover comprises a first series of cavities 46 opening at the same time on the lateral wall and on the external end wall 41 and a second series of cavities 48 opening at the same time on the lateral wall 43 and on the end inner wall 42. As is evident from FIG. 2, these cavities do not extend over the entire circumference of the cover but are staggered or offset angularly, specifically the cavities of the first series extend in a first portion of the lateral wall, while the cavities of the second series extend in a second portion of the lateral wall separate from the first series without overlapping. In this way, the bottom wall 47 of the first series of cavities 46 forms a first axial shoulder, while the bottom wall 49 of the second series of cavities 48 forms a second opposite axial shoulder, these shoulders, as shown in FIG. 4, immobilising the external envelope and the cover relative to each other at least axially, when the unit has undergone the method according to the invention described in detail hereinbelow and when the envelope 20 has been deformed to match the shape of the cover. This embodiment is advantageous since it decreases the bulk of the cover and simplifies its manufacture.

The thicknesses (according to the normal direction to the end walls) of the cavities 46, 48 of the first and second series are equal, and each of these thicknesses is under half the height in this direction of the cover such that the lateral wall of the cover comprises a central portion 51 extending over its entire circumference between the cavities and easily ensuring sealing of the cover/envelope bond. However, the thicknesses of the different cavities (of the same series or both series) can be different. The sum of the thicknesses of at least one cavity of the first series and of at least one cavity of the second series can also be greater than the height of the cover, allowing for even greater decrease in thickness.

It is evident that the cover of FIG. 2 comprises a first series of cavities and a second series of cavities extending over an approximately equivalent total angular portion of the lateral wall of the cover. However, the sum of the angular portions of the cavities of one of the series, especially the first, can be greater than the sum of the angular portions of the cavities of the other series. The number of cavities of each series can also vary. The number of cavities of the first series can also be different to the number of cavities of the second series.

Similarly, the cavities 46, 48 have a thickness according to the normal direction to the end walls and in depth, according to the normal direction to the lateral wall, constant, but could be of variable thickness and/or depth.

The covers 40 and the external envelope 20 are made of electrically conductive material, such as metal.

In the example illustrated in FIG. 3, the two ends of the external envelope are not closed identically. In fact, the storage unit comprises an annular joint 60 between the cover 40 and the lower end of the external envelope 20, whereas there is no joint between the cover 40 and the upper end 22 of the external envelope 20.

It is clear that the envelope is not limited to what has been described. The envelope can for example comprise a lateral wall and be closed at one of its ends. It can also not have a cylindrical but a parallelepipedic cross-section. It must however have a lateral wall or lateral walls of a form complementary to that of the wall of the cover.

The method used to obtain the storage unit illustrated in FIG. 3 is the following:
 connect (position and weld) the covers 40 on the coiled element 30,
 impregnate the coiled element 30 connected to the covers 40 in an electrolyte,
 place the coiled element 30 connected to the covers 40 in the external envelope 20, then
 for the lower end 21 of the external envelope 20:
  position the annular joint 60 on the cover 40 (or between the external envelope and the cover),
  generate a magnetic force drawn at the level of the lower end 21 of the external envelope 20 to deform the latter such that it matches the shape of the peripheral face of the cover 40 and fits mechanically into the latter,
 for the upper end 22 of the external envelope 20:
  generate a pulsed magnetic force at the level of the upper end 22 to deform the latter so that it matches the shape of the peripheral face of the cover 40 and is welded to the latter.

The cover/envelope bond made at the level of the lower end 21 is crimping by magnetic pulse, while the cover/envelope bond made at the level of the upper end 22 is welding by magnetic pulse. Those skilled in the art will appreciate that the cover/envelope bond made at the level of the upper end 22 could be crimping by magnetic pulse, even without presence of a joint. In fact, making a bond of welding or crimping type depends of the energies used to make the bond. It is clear that the envelope is deformed because, as the force is applied all over the unit and the cover is a solid piece, it does not undergo substantial deformation, but the envelope has a central gap and can therefore contract at the level of this gap.

FIG. 4 also illustrates an embodiment of a device for executing the method described above. The device comprises a compressor for applying a contactless compression force to one of the pieces comprising the energy-storage unit. This allows mechanical fitting of the cover and of the external envelope to close the storage unit by cooperation of form between the external envelope and the cover.

In the embodiment illustrated in FIG. 4, the compressor consists of an inductor—such as a coil—capable of applying a contactless magneto-mechanical force. The inductor is for example a coil.

The device comprises a generator (not shown) connected to the coil 50. The storage unit to be closed is intended to be placed in the centre of the coil 50 such that the windings of the coil enclose it partially.

The operating principle of the device will now be described in reference to the storage unit described earlier, comprising:
 an external envelope 20 comprising a coupling face 23A, 23B (constituted by the internal face of the lateral wall of the envelope),
 two covers 40 each comprising a coupling zone constituted by the lateral wall 43 of the cover and the walls 47, 49 of the cavities parallel to the end walls, each cover 40 being intended to be positioned at the level of the open ends of the external envelope, as described earlier.

To complete closing of the storage unit, the coupling zones 23A, 43-47-49; 43B, 43-47-49 are placed opposite each other.

The cover 40 and the external envelope 20 are provisionally fixed to each other. This fixing can be executed by way of various means of provisional fixing, such as for example the joint described in reference to FIG. 4 and which allows adequate adhesion of the cover 40 on the external envelope 20.

The cover 40 and the external envelope 20 are positioned at the centre of the coil 50. By way of advantage only the coupling zones 23A, 23B; 43-47-49 opposite can be placed at the centre of the coil. In other terms, it can be arranged to have in the coil only that region of the envelope where the peripheral surfaces of the external envelope and the cover are superposed. This in fact prevents the external envelope 20 from being compressed against the coiled element 30, possibly damaging the latter.

Once the storage unit is positioned, the generator (charged) discharges substantial energy over a very short time in the coil 50. The coil is oriented so that the force has an essentially radial direction.

The coupling zone 23A, 23B of the external envelope 20 is projected at considerable speed in the direction of the coupling zone 43, 47, 49 of the cover 40. The coupling zone 23 of the external envelope 20 conforms to the shape of the cover and especially the cavities 46, 48.

The device described in reference in FIG. 4 projects the external piece onto the internal piece at a speed of 150 to 600 ms.

General information on operation of the generation device of the pulse is the following:
 maximum energy: 25 kJ,
 frequency: 15 kHz,
 Capacitance: 300 to 800 pF,
 Voltage: 5-6 kV.

The generation device of the magneto-mechanical pulse can be used to crimp or weld as a function of the parameters of use of the latter:
 power:
  crimping: 8 kJ,
  welding: 15 to 18 kJ,
 Amperage:
  Crimping: 150 A-250 A,
  Welding: 450 to 600 A.

Executing the method according to the invention by means of a magneto-mechanical force enables manufacture of storage units having particular technical characteristics not found in storage units obtained from former manufacturing methods based on welding, crimping or even adhesion. In particular, the storage unit resulting from using the method and the device according to the invention has no traces of contact with a tool having carried out mechanical crimping. In fact, crimping by magnetic pulse occurs without tools in contact (as opposed to rolling) and without a change of state of metals (as opposed to welding and brazing). The unit according to the invention can however be assembled by crimping or mechanical stamping.

It is evident that close analysis by metallography of a storage unit resulting from conducting the closing step with a magneto-mechanical force observes small wavelets inherent in the propagation of a shockwave at the interface of welding or crimping. Also, there is no modification of the orientation of the grains at the level of the welding or crimping interface, as opposed to methods of the state of the art using mechanical crimping.

Those skilled in the art will understand that many modifications can be made to the device and method described above without materially departing from new ideas presented here. It is therefore clear that the examples given above are only particular illustrations and in no way limiting. As a consequence, all modifications of this type are intended to be incorporated inside the scope of the attached claims.

The invention claimed is:

1. A cover for an energy-storage unit, intended to be inserted at one end of an envelope wherein a capacitive element of the unit is placed, the cover comprising at least one lateral wall intended to be placed opposite at least one lateral wall of the envelope one external end wall and one internal end wall for receiving a part of the envelope, wherein a plurality of cavities is made in the cover, at least one first cavity opening on the lateral wall or the lateral walls and the external end wall and at least one second cavity opening on the lateral wall or the lateral walls and the internal end wall, the first cavity or the first cavities opening on the lateral wall or the lateral walls in a first portion or first portions extending over part of the circumference of the lateral wall or lateral walls, while the second cavity or the second cavities opens on the lateral wall or the lateral walls in a second portion or second portions extending over part of the circumference of the lateral wall or lateral walls, and
   wherein the first and second portions of the lateral wall are at least partially offset angularly in a plane corresponding to that of the end walls.

2. The cover according to claim 1, wherein the first and second cavities are arranged staggered.

3. The cover according to claim 1, wherein the sum of the thicknesses of at least one first and a second cavity in a normal direction to at least one end wall is greater than the thickness of the cover in this direction.

4. The cover according to claim 1, wherein the lateral wall or the lateral walls of the cover comprise a central part extending over the entire circumference of the lateral wall or lateral walls of the cover and devoid of cavity.

5. The cover according to claim 1, of general cylindrical form and whereof the external and internal end walls form the bases of the cylinder.

6. The cover according to claim 1, made at least partially of electrically conductive material, especially metallic material.

7. An energy-storage unit comprising a capacitive element housed in an external envelope comprising at least one lateral wall enclosing the capacitive element and open at at least one of its ends, and at least one cover, each cover being inserted in the envelope at its open end or its open ends, at least one cover being according to claim 1 and the contour of the lateral wall or lateral walls of the envelope following matching the contour of the lateral wall or lateral walls of the cover.

8. The unit according to claim 7, wherein the envelope is made at least partially of electrically conductive material, especially metallic material.

9. The unit according to claim 7, which comprises a joint interposed between the lateral wall of the cover and the lateral wall of the envelope.

10. A method for manufacture of a storage unit according to claim 8, wherein the method comprises:
    an external envelope comprising a coupling zone, the external envelope being open at at least one of its ends,
    at least one cover intended to be inserted in the open end of the external envelope, the cover comprising a coupling zone comprising at least one wall of a cavity of the cover, the cover being positioned such that the coupling zones are opposite each other,
    the method comprising a closing step of applying a contactless magneto-mechanical compression force to the external envelope of the storage unit such that said external envelope comes into contact with the cover at the level of the coupling zones to close the open end of the external envelope with the cover by cooperation of form.

11. The unit according to claim 7 wherein the open end of the envelope is deformed so as to match the shape of the peripheral face of the cover and is crimped or welded to the latter.

* * * * *

UNITED STATES PATENT AND TRADEMARK OFFICE
CERTIFICATE OF CORRECTION

PATENT NO.       : 9,490,078 B2
APPLICATION NO.  : 14/377169
DATED            : November 8, 2016
INVENTOR(S)      : Erwan Vigneras It is certified that error appears in the above-identified patent and that said Letters Patent is hereby corrected as shown below:

In the Claims

On Column 10, Claim 7, Line 19, please delete "following".

Signed and Sealed this
Eleventh Day of April, 2017

Michelle K. Lee
*Director of the United States Patent and Trademark Office*